Aug. 26, 1924.
F. W. T. ZOEPKE
1,506,212
THRASHING MACHINE
Original Filed Feb. 18, 1922
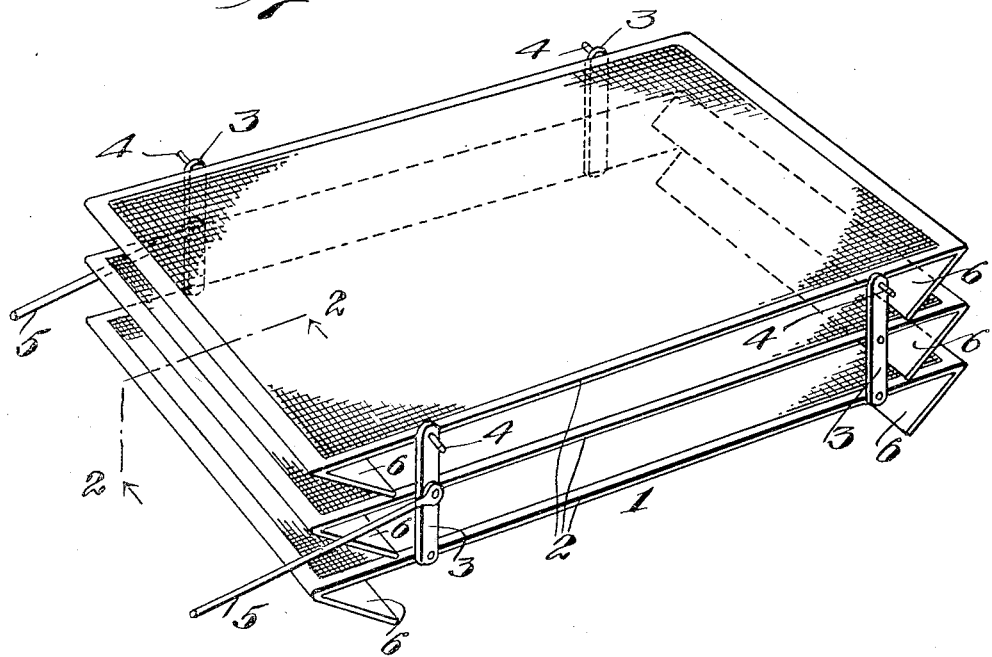
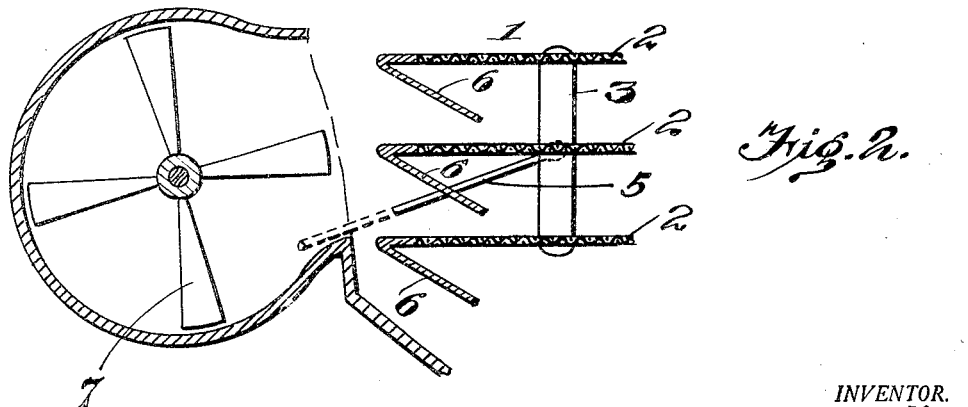
INVENTOR.
F. W. T. Zoepke.
BY
ATTORNEYS.

Patented Aug. 26, 1924.

1,506,212

UNITED STATES PATENT OFFICE.

FRED W. T. ZOEPKE, OF GREAT FALLS, MONTANA.

THRASHING MACHINE.

Original application filed February 18, 1922, Serial No. 537,519. Divided and this application filed March 17, 1923. Serial No. 625,363.

*To all whom it may concern:*

Be it known that I, FRED W. T. ZOEPKE, a citizen of the United States, residing at Great Falls, in the county of Cascade and State of Montana, have invented certain new and useful Improvements in Thrashing Machines, of which the following is a specification, reference being had therein to the accompanying drawings.

This invention relates to a thrashing machine, and the object of the invention is the construction of a simple and efficient screening device adapted for use in a thrashing or harvesting machine.

This is a divisional application, growing out of my original application, Serial No. 537,519, filed February 18, 1922, and entitled "Harvesting machine".

With the foregoing and other objects in view, my invention comprises certain novel combinations, constructions and arrangements of parts as will be hereinafter described, illustrated in the accompanying drawings, and more particularly pointed out in the appended claim.

In the drawings:

Figure 1 is a perspective view of a screening device constructed in accordance with the present invention.

Figure 2 is a sectional view, taken on line 2—2, Fig. 1, and looking in the direction of the arrows.

Referring to the drawings by numerals, 1 designates the screening device which comprises a plurality of screens 2, of similar construction, except that the top screen is of larger mesh than the middle screen and the middle screen is of larger mesh than the lower screen.

The screens 2 are pivotally mounted on vertical supporting-bars 3, and by means of horizontal pins 4 the screen device 1 is pivotally supported upon a suitable support or a thrashing machine as specifically illustrated in my co-pending application, Serial No. 537,519, hereinbefore mentioned.

Rods 5 are pivotally connected at one end to some of the bars 3, and these rods 5 are connected to a suitable operating mechanism, as clearly disclosed in the aforesaid co-pending application.

I make no claim to the specific connection of the rods 5 as any ordinary means for shaking the screening device 1 may be employed for operating said rods.

Each screen 2 is provided with downwardly and inwardly-extending ends 6 so that the air from a fan 7 (as shown in the aforesaid co-pending application) will be forced down close to the top of the two lower screens for blowing the chaff directly off the screen. The speed of the fan 7 will govern the force of air passing over the grain on the screening device 1. Dirt or chaff from the screening device will be sucked up by a fan and discharged through the spout, as fully disclosed in said co-pending application.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claim.

What I claim is:

In a structure of the character described, a plurality of screens positioned horizontally and disposed one above another in spaced relation, each screen being provided with flanges extending downwardly from its ends and at an inward incline whereby an air blast passing longitudinally between the screens may be directed towards the upper surfaces of the lower screens.

In testimony whereof I hereunto affix my signature.

FRED W. T. ZOEPKE.